United States Patent [19]

Harris

[11] Patent Number: 4,826,511
[45] Date of Patent: May 2, 1989

[54] VAPOR RECOVERY SYSTEM

[75] Inventor: Robert S. Harris, Connersville, Ind.

[73] Assignee: Stant Inc., Connersville, Ind.

[21] Appl. No.: 182,256

[22] Filed: Jul. 19, 1988

Related U.S. Application Data

[63] Continuation of Ser. No. 846,081, Mar. 31, 1986, Pat. No. 4,770,677.

[51] Int. Cl.$^4$ .............................................. B01D 19/00
[52] U.S. Cl. ...................................... 55/168; 141/302
[58] Field of Search ................... 55/88, 165, 168, 182, 55/387; 141/44, 45, 286, 302; 220/85 VR, 85 VS, 86 R

[56] References Cited

U.S. PATENT DOCUMENTS

| | | | |
|---|---|---|---|
| 3,289,711 | 12/1966 | Hall | 55/387 |
| 3,477,611 | 11/1969 | Niles | 220/86 |
| 3,543,484 | 12/1970 | Davis | 55/387 |
| 3,643,690 | 2/1972 | Sarai | 137/587 |
| 3,752,135 | 8/1973 | Peterson et al. | 220/85 VR X |
| 3,763,901 | 10/1973 | Viland | 141/8 |
| 3,854,911 | 12/1974 | Walker | 55/387 |
| 3,884,204 | 5/1975 | Krautwurst et al. | 123/136 |
| 3,907,010 | 9/1975 | Burtis et al. | 141/45 |
| 3,907,153 | 9/1975 | Mutty | 220/86 R |
| 3,911,977 | 10/1975 | Berger | 141/348 |
| 3,921,412 | 11/1975 | Heath et al. | 62/54 |
| 4,034,784 | 7/1977 | Ball et al. | 141/348 |
| 4,044,913 | 8/1977 | Brunnert | 220/86 R |
| 4,142,647 | 3/1979 | Walters | 220/85.8 |
| 4,312,649 | 1/1982 | Fujii et al. | 55/387 |
| 4,323,166 | 4/1982 | Maeroff | 220/86 R |
| 4,384,962 | 5/1983 | Harris | 210/788 |
| 4,420,392 | 12/1983 | Harris | 210/86 |
| 4,441,533 | 4/1984 | Snyder et al. | 141/59 |
| 4,497,714 | 2/1985 | Harris | 210/788 |
| 4,610,284 | 9/1986 | Bartholomew | 141/302 |
| 4,630,749 | 12/1986 | Armstrong et al. | 220/86 R |
| 4,651,889 | 3/1987 | Uranishi et al. | 220/86 |
| 4,701,198 | 10/1987 | Uranishi et al. | 55/387 |
| 4,714,172 | 12/1987 | Morris | 220/86 R |
| 4,722,454 | 2/1988 | Fischer | 220/85 R |

OTHER PUBLICATIONS

On-Board Refueling Vapor Recovery System VII (5-9-86)/MB/7820).
Pneumatic Running Loss Control Valve (5-2-7-86/RTC/7820; one figure.
Pneumatic Running Loss Control Valve (5-2-7-86/RTC/7820; two figures: Sketch 1-RLCV).
Preliminary Performance Requirements PPF-7820-6 (Change Level "A"/5-19-86/D. McGeary/7820).

Primary Examiner—Charles Hart
Attorney, Agent, or Firm—Barnes & Thornburg

[57] ABSTRACT

A vapor recovery system is provided for recovering fuel vapors discharged from a fuel tank having a vent tube and a separate filler neck during refueling. The vapor recovery system includes a partition dividing the filler neck into an outer chamber communicable with the atmosphere and an inner chamber in fluid communication with the fuel tank. The partition includes an aperture for sealingly admitting a fuel dispensing nozzle into the inner chamber without coupling the inner and outer chambers in fluid communication during refueling. A fuel cap may sealingly engage the filler neck to close the mouth of the filler neck. A refueling sensing system is provided for actuating a flow valve during an initial stage of each refueling activity to permit flow of fuel vapor to the canister. Upon removal of the fuel cap, fuel vapor discharged from the fuel tank is conducted automatically to the canister for processing therein instead of being discharged directly into the atmosphere. Illustratively, the refueling sensing system is included in the fuel cap.

2 Claims, 3 Drawing Sheets

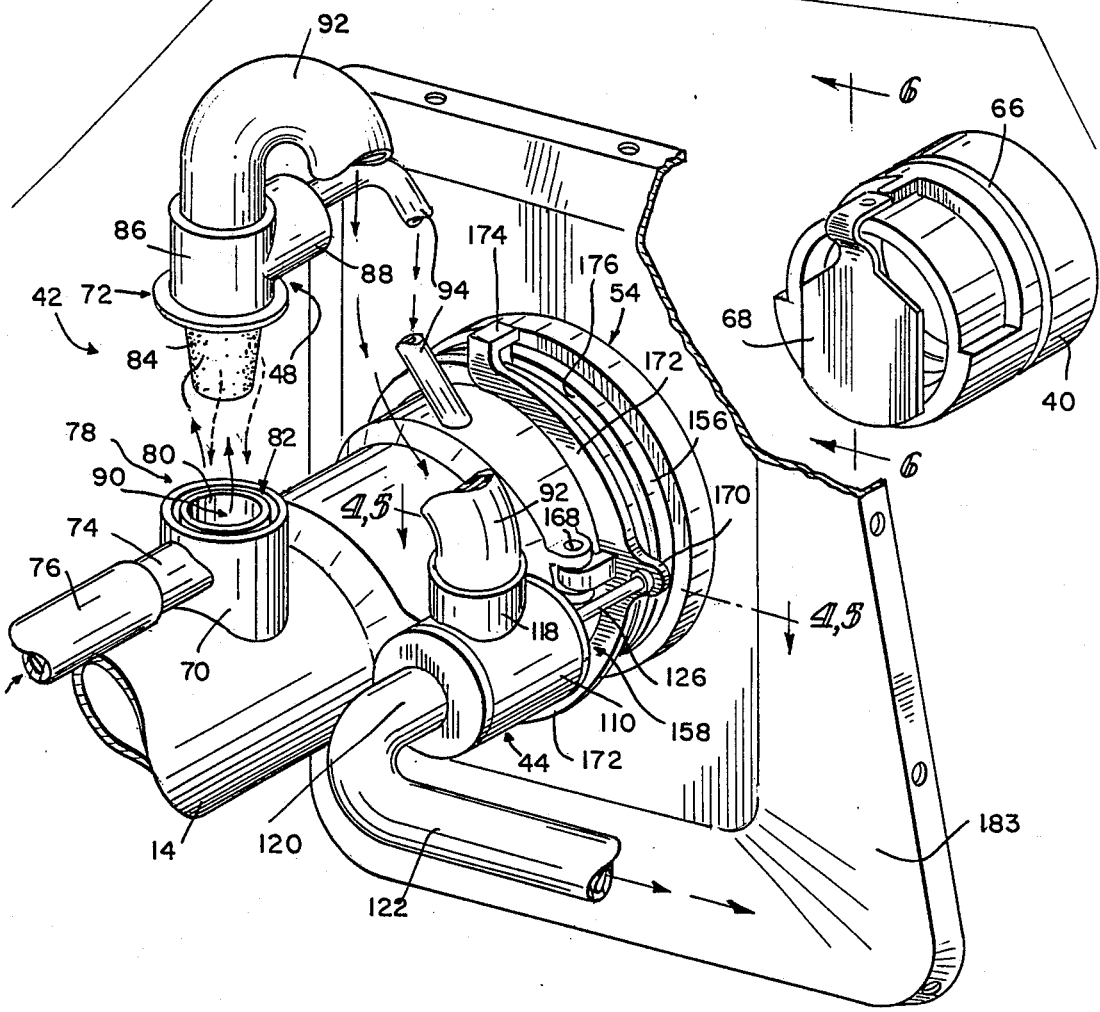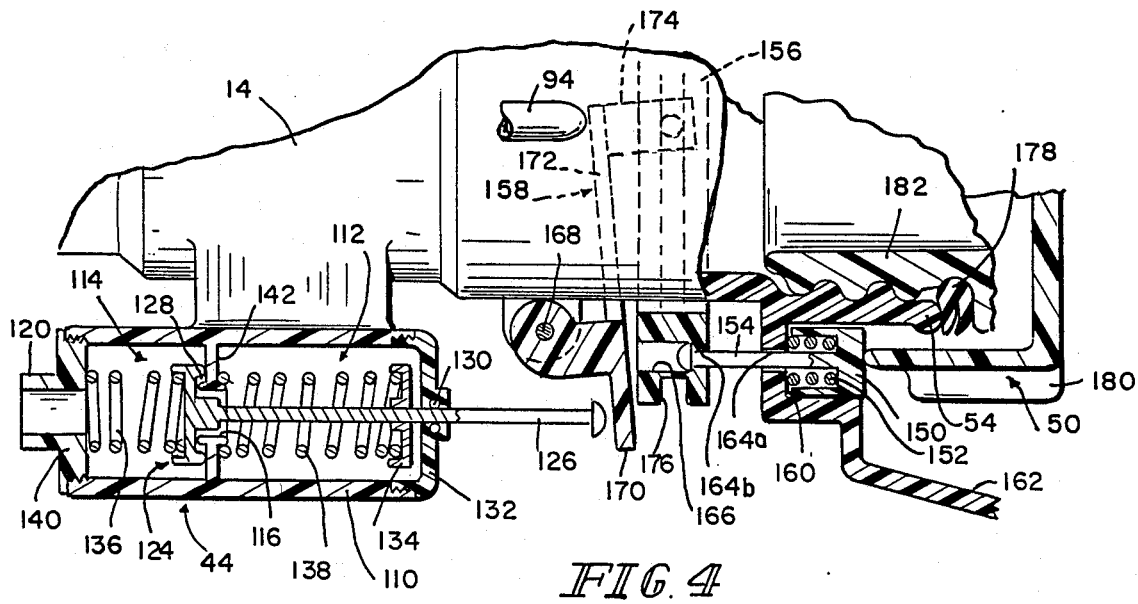

VAPOR RECOVERY SYSTEM

This is a continuation of application Ser. No. 06/846,081 filed Mar. 31, 1986 now U.S. Pat No. 4,770,677.

BACKGROUND AND SUMMARY OF THE INVENTION

This invention relates to vehicle emissions control, and particularly to a refueling vapor recovery system designed to capture, store, and subsequently purge the fuel vapors that are displaced and generated during a typical vehicle refueling operation.

Polluting emissions are released into the atmosphere during each and every motor vehicle refueling activity. Typically, removal of a fuel cap permits pressurized fuel vapors present within the vehicle fuel system to escape to the atmosphere. In view of the frequency of vehicle refueling activities, it will be appreciated that a significant quantity of otherwise combustible fuel is lost to the atmosphere each time a vehicle is refueled.

New fuel vapors are generated during refueling due to splash and agitation of the dispensed fuel, as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the fuel tank vapor space by the displacing action of the liquid fuel. In conventional vehicle fuel systems, these displaced vapors are released directly into the atmosphere via the fuel tank filler neck and are a contributing factor to air pollution.

One object of the present invention is to provide an emissions control system for advantageously capturing fuel vapors normally discharged during a vehicle refueling activity so as to reduce waste of fuel energy resources, assist in reducing the level of air pollution, and avoid the shortcomings of conventional vehicle fuel systems.

Another object of the present invention is to provide a fuel vapor recovery system that conforms to all government environmental and safety regulations regarding evaporative and refueling emissions, exhaust emissions, and vehicle impact, and that also satisfies customer-perceived vehicle functions such as drivability, ease of refueling, and control of fuel vapor odor.

According to the present invention, a vapor control system includes partition means for sealing a fuel dispensing nozzle to a fuel tank filler neck during refueling to prevent loss of fuel vapor to the atmosphere and separator means for separating liquid fuel entrained in the fuel vapor from fuel vapor discharged from the fuel tank via a fill-limiting vent tube. Preferably, the partition means divides the fuel tank filler neck into separate sealed inner and outer chambers and is configured to admit a fuel-dispensing nozzle into the inner chamber without coupling the inner and outer chambers together in fluid communication during refueling. Vapor recovery means is provided for selectively processing fuel vapor discharged from the separator means to reduce environmentally hazardous emissions without discharging unprocessed fuel vapor to the atmosphere during refueling.

In preferred embodiments, the vapor recovery means selectively delivers fuel vapor discharged from the separator means to a carbon canister or other vapor condenser positioned elsewhere in the vehicle, thereby reducing the mass of fuel discharged into the atmosphere during refueling. The vapor recovery means includes actuation means in a vapor flow passage for automatically moving a refueling control valve, which valve is normally spring-biased to its passage-closing position, to its passage-opening position. This permits fuel vapor discharged from the fuel tank during each refueling activity to be conducted to the canister for liquid fuel recovery treatment therein prior to being discharged to the atmosphere. Preferably, the actuation means includes means for sensing the beginning of a vehicle refueling activity cycle.

A fuel cap is provided for closing and sealing the mouth of the fuel tank filler neck. In preferred embodiments, sufficient loosening of the fuel cap on the filler neck actuates the refueling control valve to initiate a vapor recovery sequence without breaking the vapor seal provided by the fuel cap or otherwise permitting untreated fuel vapor to be discharged directly into the atmosphere. The sensing means includes a control pad movable relative to the filler neck between positions in close proximity to the mouth of the filler neck. Illustratively, the control pad is spring-biased against the fuel cap whenever the fuel cap is mounted on the filler neck. Illustratively, a mechanical linkage is provided for moving the refueling control valve to its passage-opening position in response to spring-biased movement of the control pad during removal of the fuel cap. In this way, fuel vapor discharged from the fuel tank is conducted automatically to a fuel vapor treatment site such as a canister instead of being discharged directly into the atmosphere through the filler neck mouth.

Also in preferred embodiments, the vapor control system further includes a safety pressure-relief valve for exhausting fuel vapor discharged from the separator means directly to the atmosphere during disablement of the vapor recovery means. Any pressurized fuel vapor in excess of design limits is vented to the outer chamber for discharge to the atmosphere whenever vapor flow exceeds the capacity of the system. Preferably, the pressure-relief valve is a "whistle" valve. In other words, this valve is configured to issue a sonic warning to a refueling attendant whenever the pressure-relief valve is activated so that necessary corrective action can be taken to repair flow blockage in the system.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 3 is an exploded perspective view of a preferred embodiment of a vapor recovery module in accordance with the present invention with portions broken away;

FIG. 4 is a longitudinal sectional view taken along lines 4—4 of FIG. 3 showing a fuel cap mounted on a fuel tank filler neck in a fully-tightened position during normal non-refueling activities;

DETAILED DESCRIPTION OF THE DRAWINGS

Figure 1:
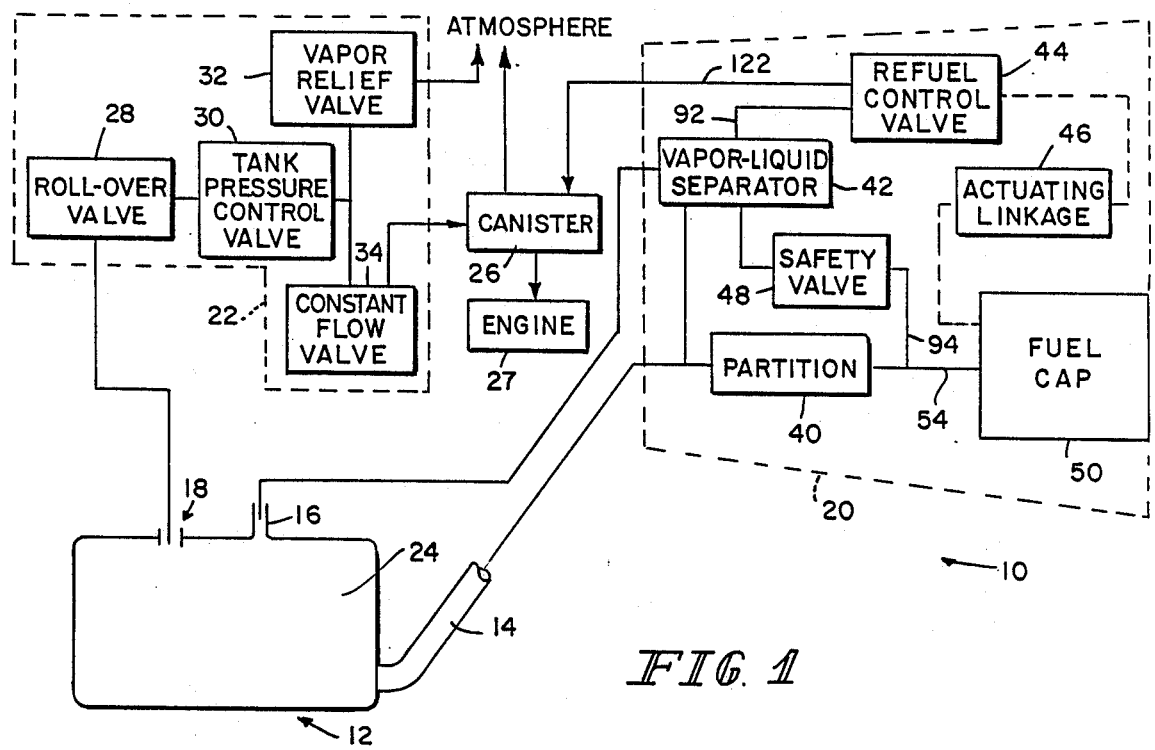
FIG. 1 is a block diagram of a system for recovering vapors during a vehicle refueling activity in accordance with the present invention.

Referring to FIG. 1, one preferred embodiment of a vapor recovery system 10 includes a fuel tank 12 having a filler neck 14, a fill-limiting vent tube 16, and a vent valve opening 18, a vapor recovery module 20, and a roll-over valve module 22. The vapor recovery module 20 is automatically actuated in the manner explained below to conduct substantially all fuel vapors that are present in the vapor space 24 of the fuel tank 12, displaced by liquid fuel during refueling, and generated during refueling, to a fuel vapor treatment site 26 for environmental treatment therein. Preferably, a conventional charcoal canister or other vapor condenser is provided at treatment site 26 to adsorb liquid fuel entrained in the recovered fuel vapors onto a substrate to permit recombustion in vehicle engine 27 at a later time.

In the embodiment of FIG. 1, the roll-over valve module 22 includes a roll-over valve 28, a tank-pressure control valve 30, a vapor-relief valve 32, and a constant flow valve 34. The roll-over valve module 22 is preferably mounted in a wall of the fuel tank 12 at vent valve opening 18. The roll-over valve module 22 serves a dual purpose by selectively releasing fuel vapors from the vapor space 24 to either the canister 26 or the atmosphere so as to regulate flow of fuel vapors to the canister 26, and by automatically closing the vent valve opening 18 during a vehicle rollover accident so as to guard against hazardous fuel leakage. Reference is hereby made to a U.S. Pat. No. 4,655,238 entitled: "Roll-over Valve," which patent application is filed simultaneously with the present application and assigned to the same assignee as the present invention, for a complete disclosure of a roll-over valve assembly suitable for use in the vapor recovery system 10.

As shown in block diagram form in FIG. 1, the vapor recovery module 20 includes a partition 40 in the filler neck 14, a vapor-liquid separator 42, a refuel control valve 44, an actuating linkage 46, a safety valve 48, and a fuel cap 50. Illustratively, the actuating linkage 46 provides means for sensing whenever the fuel cap 50 is loosened a sufficient amount during an initial stage of each refueling activity. The actuating linkage 46 also provides means for actuating the refuel control valve 44 in response to the sensing means. Actuation of refuel control valve 44 permits fuel vapors present in the vapor space 24, and otherwise associated with refueling, to be conducted to the canister 26 via a vapor flow path in the vapor recovery module 20 instead of allowing such environmentally damaging vapor to escape untreated to the atmosphere through filler neck outlet 54. FIGS. 3-6 illustrate one preferred arrangement of the components illustrated in block diagram form in FIG. 1.

Figure 6:
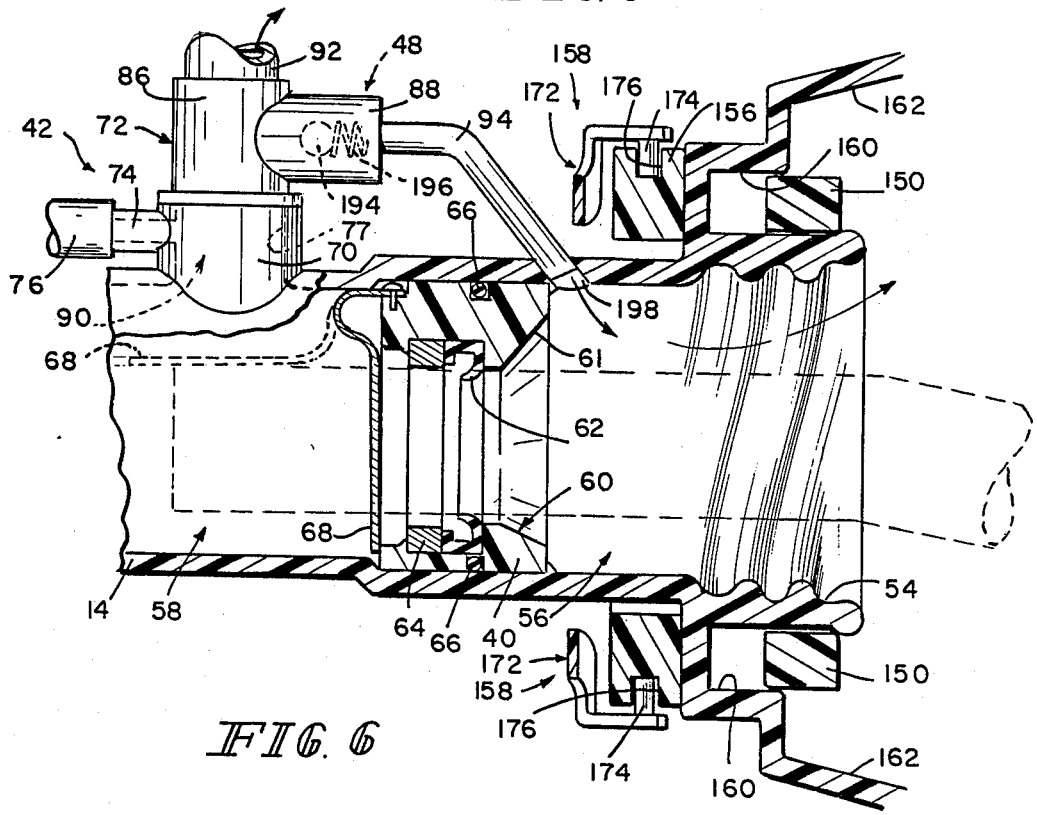
FIG. 6 is a longitudinal sectional view taken along lines 6—6 of FIG. 3 showing a fuel-dispensing nozzle in phantom lines inserted into the fuel tank filler neck during refueling.

Referring primarily to FIGS. 1 and 6, partition 40 is staked in place in the filler neck 14 in proximity to the filler neck mouth 54 to separate filler neck 14 into an outer chamber 56 and an inner chamber 58. The outer chamber 56 is communicable with the atmosphere via filler neck mouth 54 whenever the fuel cap 50 is removed. The inner chamber 58 is always in fluid communication with the fuel tank 12 via the filler neck 14. Advantageously, partition 40 provides a vapor tight inner chamber 58 so as to prevent escape of untreated fuel vapors to the atmosphere during refueling.

At service, partition 40 may be easily detached for repair or disposal. As shown in FIG. 6, the inner diameter of outer chamber 56 is stepped to permit removal of the partition 40 therethrough. One advantage of the present invention is that partition 40 is replaceable as a unit for service through the outer chamber 56 and filler neck mouth 54 without disassembly of the vapor recovery module 20 from its installed position in a vehicle. After service, a repaired or replacement partition may be staked into a proper position within filler neck 14.

Partition 40 includes a nozzle size-restricting passageway 60 for admitting a pump nozzle (represented by broken lines in FIG. 6) into the inner chamber 58. An annular nozzle seal 62 sealingly embraces the pump nozzle during pumping as shown in FIG. 6. Annular nozzle seal 62 is held in sealing position in the passageway 60 by retainer 64 so that fuel can be dispensed into the inner chamber 58 without coupling the inner and outer chambers 58, 56 in fluid communication during refueling. Hard nozzle pilot surface 61 is provided in passageway 60 to protect seal 62 from damage during refueling. An O-ring seal 66 is situated in a recess formed in an exterior wall of partition 40 to engage an interior wall of passageway 60 in sealing relation. Leaded fuel splash door 68 is pivotally mounted or otherwise deflectable in relation to an inner end of partition 40 in a customary way to splash leaded fuel dispensed using an ordinary pump nozzle back toward a user.

Vapor-liquid separator 42 is used for separating liquid fuel entrained in fuel vapor discharged from fuel tank 12 via a fill-limiting tube 16 and/or a filler neck 14 to reduce the mass of fuel entrained in such discharged vapor prior to introducing the vapor into canister 26. As shown best in FIG. 3, the separator 42 includes a hollow base 70 fixed to an exterior surface of filler neck 14 and a top cover assembly 72.

Referring to FIGS. 3 and 6, base 70 includes an inlet 74 in fluid communication with the fill-limiting vent tube 16 via pipe 76, a liquid fuel outlet 77, and an upper opening 78 coverable by top cover assembly 72. Annular shield 80 is installed in the chamber provided by hollow base 70 in spaced relation to define an annular swirl passage 82 therebetween. The top cover assembly 72 includes a discriminator screen 84, a fuel vapor outlet 86, and a pressure-relief outlet 88. The discriminator screen 84 depends therefrom so that it is suspended in an interior space 90 of annular shield 80 when the top cover assembly 72 is mounted on the hollow base 70.

In use, fuel vapor introduced into separator 42 is swirled through swirl passage 82 causing liquid fuel (represented by broken line arrows in FIGS. 3 and 6) entrained in the fuel vapor to move downwardly toward the liquid fuel outlet 77 while the remaining lower density fuel vapor (represented by solid line arrows in FIGS. 3, 5, and 6) moves upwardly toward the fuel vapor outlet 86. The discriminator screen 84 intercepts the swirling fuel vapor so that some of the liquid fuel entrained in the vapor coalesces or otherwise agglomerates thereon to form liquid fuel droplets that once formed fall under gravity toward liquid fuel outlet 77. Fuel vapor outlet 86 is coupled to refuel control valve 44 by pipe 92 and pressure-relief outlet 88 is coupled directly to safety valve 48. In addition, liquid fuel outlet 77 is coupled to inner chamber 58 of the filler neck 14 to provide means for recovering separated liquid fuel by recirculation of same to the fuel tank 12 via filler neck 14.

Figure 5:
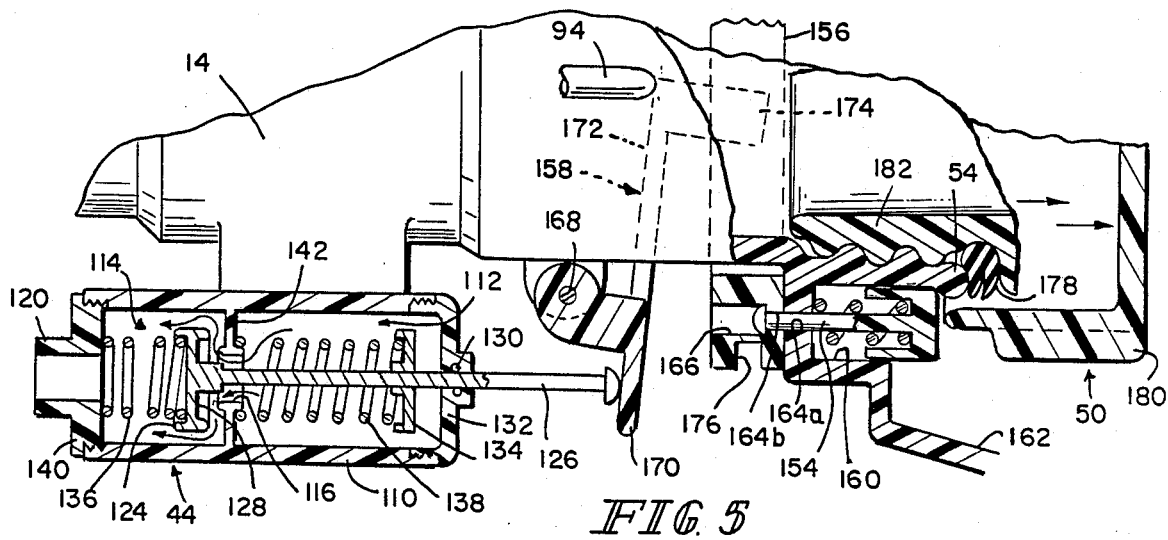
FIG. 5 is a view similar to the view in FIG. 4 showing the fuel cap in a slightly loosened position during an initial stage of fuel vapor recovery.

Refuel control valve 44 regulates the flow of fuel vapor discharged from separator 42 to the canister 26 so that such flow is permitted only during vehicle refueling activity. Referring to FIGS. 4 and 5, the refuel control valve 44 includes a valve housing 110 providing downstream chamber 112 coupled in fluid communication to an upstream chamber 114 by central aperture 116. As shown best in FIG. 3, the refuel control valve 44 also includes a fuel vapor inlet 118 coupled to the fuel vapor outlet 86 of separator 42 via pipe 92 and fuel vapor outlet 120 coupled to canister 26 via pipe 122.

A primary valve head 124 is provided in upstream chamber 114 for closing central aperture 116 during all period of non-refueling activity to prevent unwanted distribution of fuel vapor from separator 42 to the canister 26. Valve stem 126 extends in substantially spaced-apart parallel relation to filler neck 14 from a downstream face 128 of valve head 124 through a bearing support 130 provided in end wall 132 of valve housing 110 toward the filler neck mouth 54. A secondary valve head 134 is provided in downstream chamber 112 and rigidly attached to valve stem 126 for movement therewith.

The primary valve head 124 is normally loaded to its shut-off position closing aperture 116 by each of biasing springs 136, 138 as shown best in FIG. 4. Primary biasing spring 136 acts between fixed end wall 140 and movable primary valve head 124 while secondary biasing spring 138 acts between fixed central wall 142 and movable secondary valve head 134. It will be appreciated that such a dual-spring arrangement advantageously ensures substantially fail-safe operation of refueling control valve 44 in that the primary valve head 124 will remain in its normally closed shut-off position even if one of springs 136, 138 should fail.

Actuating linkage 46 provides one preferred means for actuating the refueling control valve 44 during a predetermined initial stage of each refueling activity. In the illustrated embodiment, a mechanical spring-biased linkage is provided for sensing when fuel cap 50 is loosened from its mounted position on the filler neck 14, which loosening is indicative of the beginning of a refueling activity cycle, and for then moving the primary valve head 124 in opposition to biasing springs 136, 138 to an aperture (116)-opening position. Once aperture 116 is opened, fuel vapors can flow therethrough from the vapor-liquid separator 42 to the canister 26 during refueling. It will be appreciated that various hydraulic, pneumatic, electrical, and mechanical sensory switching systems could form analogs of the preferred mechanical actuating linkage 46 illustrated in FIGS. 3–6 without departing from the present invention.

One important feature of the present invention is that the vapor recovery module 20 is activated automatically or at least remotely controlled to recover fuel vapor for later recombustion whenever the vehicle is ready for refueling. It is within the scope of the present invention to actuate said linkage means by a manner other than loosening of a fuel cap. For example, actuating linkage 46 could be coupled to a fuel door, fuel pump nozzle, control button, or other similar member to permit a refueling attendant to actuate the refueling control valve 44 in a variety of different ways at a preferred moment during each refueling activity cycle.

Referring to FIGS. 3–6, actuating linkage 46 includes an annular control pad 150, pad-biasing springs 152, control rods 154, control ring 156, and pivoting yoke lever 158. As shown best in FIGS. 4–6, control pad 150 is positioned in outwardly-facing annular groove 160 formed in refueling cavity wall 162 in a region surrounding the mouth 54 of the filler neck 14. A plurality of control rods 154 extend from control pad 150 through companion rod-receiving apertures 164a,b formed in the refueling cavity wall 162 and control ring 156, respectively, into engagement with annular groove 166 formed in control ring 156 as seen in FIGS. 4 and 5. A pad-biasing spring 152 surrounds each control rod 154 to bias the control pad 150 normally from the inactive position shown in FIG. 4 to the valve-actuating position shown in FIG. 5. Although spring 152 is shown in annular groove 160 in FIGS. 4 and 5, it is expected that such a spring could alternatively be positioned elsewhere, e.g., in contact with control ring 156. Yoke lever 158 is mounted for pivotal movement about a vertical pivot axis at pivot 168. In the illustrated embodiment best seen in FIGS. 1, 4, and 5, yoke lever 158 includes a central lever arm 170 for contacting a distal end of valve stem 126 and a pair of oppositely-extending outstretched lever arms 172 for engaging the control ring 156. In particular, as best seen in FIG. 6, projections 174 on lever arms 172 engage a radially-outwardly facing channel 176 formed on an outer edge of control ring 156 to interconnect lever arms 172 and control ring 156.

The safety valve 48 is illustrated in FIGS. 1, 3, and 6 and includes a normally closed poppet valve 194 and biasing means 196 for yieldably biasing the poppet valve 194 from an open venting position (not shown) to its normally closed position. The poppet valve 194 is moved against the yieldable biasing means 196 whenever the pressure in a vapor flow passage 16, 70, 76, 92, 110, and 122 coupling the fuel tank 12, vapor-liquid separator 42, refuel control valve 44, and vapor treatment site 26 in fluid communication exceeds a predetermined threshold pressure level. In addition, the safety valve 48 is configured to issue a sonic warning to a refueling attendant during exhaustion to the atmosphere via pipe 94, outlet opening 198, and outer chamber 56 of the fuel vapor discharged from the vapor-liquid separator 42 via the open poppet valve 194. Thus, the safety valve 48 is designed to provide a bypass conduit around the sealed partition 40 to provide a means for discharging fuel vapor to the atmosphere during refueling in the event the refuel control valve 44, actuating linkage 46, or other component is disabled due to malfunction.

In operation, loosening of fuel cap 50 allows control pad 150 to be urged by spring 152, to the right of its position shown in FIG. 4 toward its valve-actuating position shown in FIG. 5. At the same time, control rods 154 pull control ring 156 also to the right causing yoke lever 158 to pivot in a clockwise direction about its pivot axis 168, pushing the distal end of valve stem 126 to the left of its position shown in FIG. 4, thereby causing valve heads 124, 134 to compress springs 136, 138, respectively. Such movement opens valve head 124 permitting fuel vapor to be conducted therethrough to the canister 26 in response to loosening of the fuel cap 50. It is envisioned that fuel cap 50 threadedly engages the filler neck 14 at its mouth 54 so that fuel cap 50 may be loosened simply by rotation. Seal 178 is provided between filler neck cap 14 and fuel cap 50 to seal outer chamber 56 at its outermost end 54 as shown best in FIGS. 4 and 5.

Fuel cap 50 provides suitable means for actuating control pad 150 to vent vapor through the refueling control valve assembly 44 without prematurely breaking the seal provided by seal 178. This seal-maintaining function could be accomplished in a number of different ways. Preferably, fuel cap 50 includes a lost-motion feature so that a control pad-activating grip portion 180 of fuel cap 50 is movable relative to an inner seal-maintaining portion 182 also of the cap 50 during the initial stages of every refueling activity. Thus, the refueling attendant can rotate grip portion 180 a sufficient amount, desirably about one-half of a full turn, to release the outwardly biased control pad 150 without rotating seal-maintaining portion 182, which release could result in prematurely breaking the seal provided by seal 178.

Figure 2:
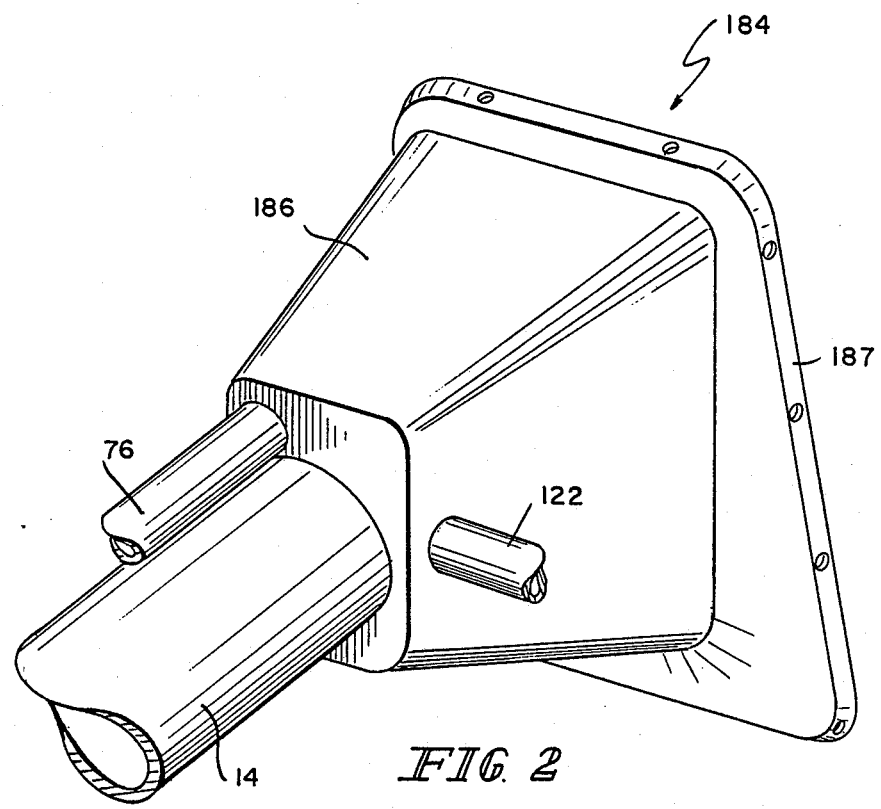
FIG. 2 is a perspective view of an impact shield for use in protecting a portion of the system of the present invention.

Referring to FIGS. 2 and 3, refueling module impact shield 184 is provided for mounting to interior plate 183 within the vehicle interior to protect exposed portions of vapor recovery module 20. The impact shield 184 includes a shield housing 186 provided with peripheral mounting flange 187. The impact shield 184 is formed to include apertures provided with fill, fill-limit, and canister connections and is constructed of a high impact nylon material or the like to protect sensitive components of vapor recovery module 20.

In another embodiment (not shown) of the system shown in FIG. 1, it is contemplated that roll-over valve module 22 be incorporated directly into the structure of the vapor recovery module 20. In one arrangement, this could be accomplished by coupling (not shown) in fluid communication the fuel vapor inlet port of roll-over valve 28 to fuel vapor outlet 86 of vapor-liquid separator 42 instead of being coupled in fluid communication to fuel tank vapor space 24 via vent valve opening 18. It will be appreciated that various components of the roll-over valve module 22 could be included, either individually or in combination, in various locations within the network of the vapor recovery module 20 without departing from the scope of the present invention.

Although the invention has been described in detail with reference to certain preferred embodiments, variations and modifications exist within the scope and spirit of the invention as described and as defined in the following claims.

What is claimed is:

1. In a vehicle having a fuel tank, a filler neck for filling the fuel tank, the filler neck having an interior region, a cap for closing the filler neck, and a vapor treatment site, an improved system for capturing vapors normally discharged during a vehicle refueling activity wherein the improvement comprises means for providing a vent passageway in fluid communication with the fuel tank and the vapor treatment site, valve means situated in a position outside of the interior region of the filler neck for normally closing the vent passageway, the valve means being movable between a vent passageway-opening and vent passageway-closing position, and means for moving the valve means to its vent passageway-opening position in response to predetermined movement of the cap relative to the filler neck so that fuel vapors in the fuel tank are conducted toward the vapor treatment site via the vent passageway.

2. the improvement of claim 1, wherein the moving means is situated in a position outside of the interior region of the filler neck.

* * * * *